United States Patent
DeLuca

(12) 
(10) Patent No.: US 8,285,133 B2
(45) Date of Patent: Oct. 9, 2012

(54) DYNAMIC LIGHTING CONTROL IN HYBRID CAMERA-PROJECTOR DEVICE

(75) Inventor: Michael Joseph DeLuca, Boca Raton, FL (US)

(73) Assignee: Research In Motion Limited, Waterloo (CA)

( * ) Notice: Subject to any disclaimer, the term of this patent is extended or adjusted under 35 U.S.C. 154(b) by 33 days.

(21) Appl. No.: 12/959,614

(22) Filed: Dec. 3, 2010

(65) Prior Publication Data

US 2012/0141104 A1 Jun. 7, 2012

(51) Int. Cl.
*G03B 15/03* (2006.01)
*H04N 5/222* (2006.01)
(52) U.S. Cl. ........................ 396/158; 348/371
(58) Field of Classification Search .......... 396/155, 396/157, 158; 348/370, 371; 362/3, 4
See application file for complete search history.

(56) References Cited

U.S. PATENT DOCUMENTS

| 7,355,648 B1 * | 4/2008 | Braun et al. ............ 348/370 |
| 2007/0201742 A1 * | 8/2007 | Hayashi ................ 382/167 |
| 2008/0024738 A1 * | 1/2008 | Nozaki et al. ........... 353/101 |

FOREIGN PATENT DOCUMENTS

| WO | 0205549 A1 | 1/2002 |
| WO | 2010046186 A2 | 4/2010 |

OTHER PUBLICATIONS

Extended European Search Report dated Apr. 27, 2011, in European Application EP 10 19 3716.

* cited by examiner

*Primary Examiner* — W. B. Perkey
*Assistant Examiner* — Minh Phan
(74) *Attorney, Agent, or Firm* — Novak Druce + Quigg LLP

(57) ABSTRACT

A method and portable device for capturing a still image is described. The portable device comprises both an image projector for projecting images and a sensor for capturing images. A first image is captured and a flash image is generated based on the captured first image to adjust lighting of the image subject. The generated flash image is projected onto the image subject using the projector and a second image is captured while the flash image is projected onto the image subject.

15 Claims, 7 Drawing Sheets

DYNAMIC LIGHTING CONTROL IN HYBRID CAMERA-PROJECTOR DEVICE

TECHNICAL FIELD

The present disclosure relates to lighting control for photographs and in particular to lighting control in a hybrid camera-projector device.

BACKGROUND

Portable devices increasingly include a camera sensor for capturing images. These devices may include flashes to light the image subject in low light levels. Although these flashes provide sufficient lighting, they may produce undesirable side effects, such as red eye, overly bright areas, harsh colouring etc.

Projectors are used to project an image or video onto a surface. As projector technology has become smaller, projectors are being incorporated into portable devices. Although the projectors are capable of projecting light onto a surface, portable devices incorporating both a camera sensor and a sensor often include a separate flash for illuminating a subject when capturing an image.

It is desirable to reduce the number of components in a portable device that incorporates a projector and an image sensor.

BRIEF DESCRIPTION OF THE DRAWINGS

Various embodiments are described with reference to the drawings, in which.

DESCRIPTION

In accordance with the present disclosure there is provided a method of capturing a still image on a portable device. The method comprises capturing first image data of an image subject using an image sensor of the portable device, generating a flash image for adjusting lighting of the image subject based on the captured first image data, projecting the generated flash image onto the image subject using a projector of the portable device, and capturing second image data of the image subject while the flash image is projected.

In accordance with the present disclosure there is further provided a portable device comprising an image sensor for capturing image data of an image subject, at least one processor coupled to the image sensor for processing the captured image data and generating a flash image to illuminate the image subject, and an image projector for projecting images or videos for display and the generated flash image for adjusting lighting of the image subject.

Figure 1:
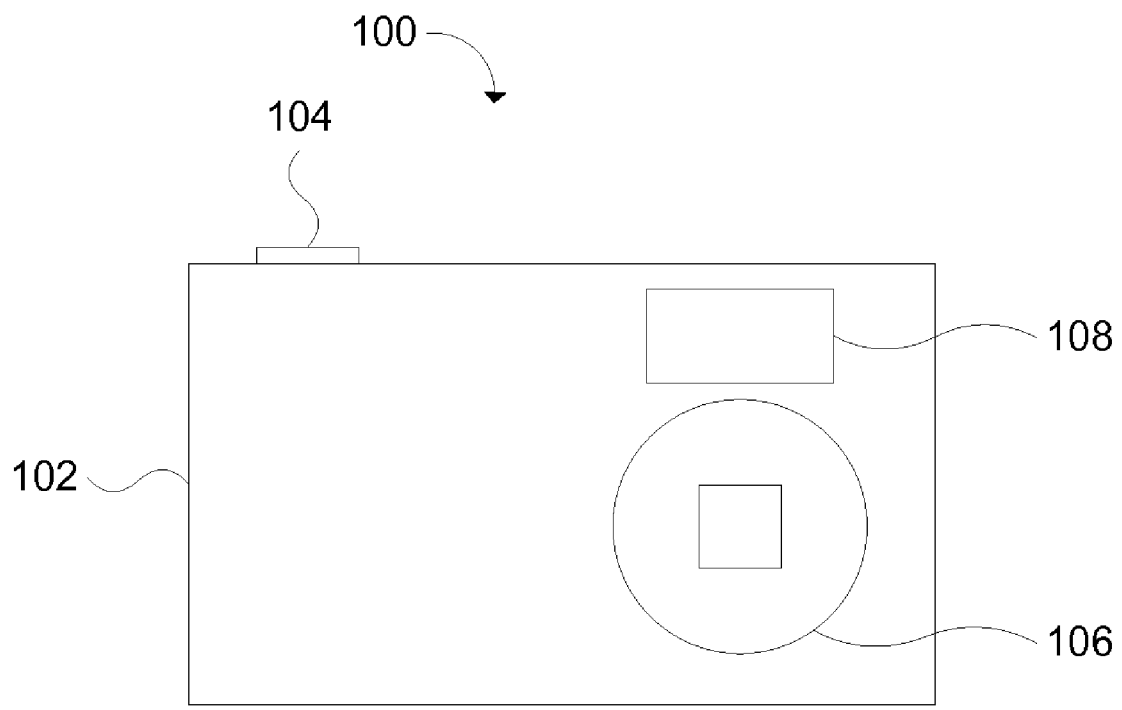
FIG. 1 depicts a block diagram of a portable device in accordance with the present disclosure.

FIG. 1 depicts a block diagram of a portable device in accordance with the present disclosure. The portable device 100 is depicted as a camera; however other types of portable devices incorporating both a camera sensor and an image projector are possible.

The portable device 100 comprises a housing 102 enclosing a plurality of components. The portable device includes one or more controls 104 for controlling operation of the components. The portable device 100 includes an image sensor 106 for capturing image data. The portable device 100 includes a projector 108 for projecting an image on to a surface. Typically the projector 108 is used to project a previously captured color or monochromatic image onto a viewing surface. However, as described further below, the projector may also be used to adjust lighting of a subject in a captured image.

Figure 2:
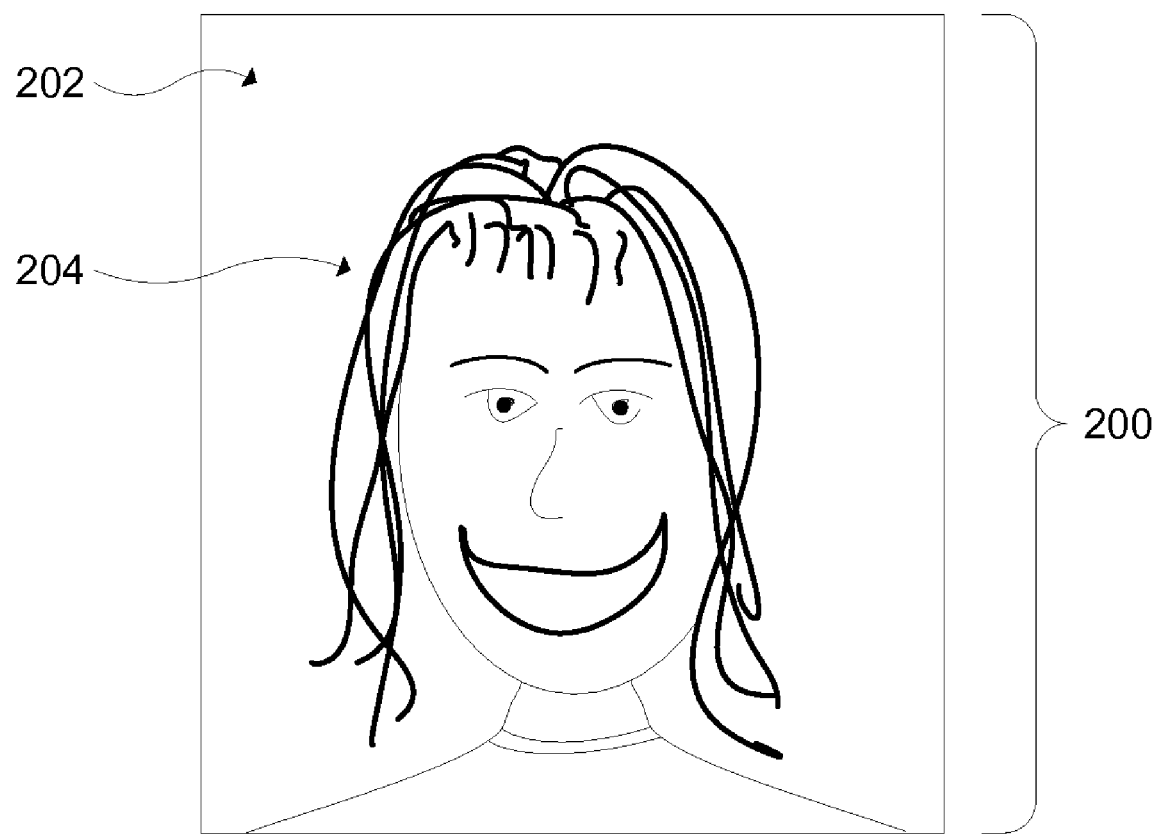
FIG. 2 depicts illustrative captured image data.

FIG. 2 depicts illustrative captured image data, a representation of which may be either captured by image sensor 106 or projected by projector 108. The projector may project the image on a viewing surface or as described further herein, onto an image subject. The captured image data 200 is depicted as being a photograph of an image subject. The captured image data 200 includes a background 202 and foreground 204. As may be appreciated, under appropriate lighting conditions, both the foreground and background will be properly lighted and a pleasing or desirable photograph will be captured by the image sensor. However, if improper lighting is used, the foreground may appear overly bright or dark compared to the background. The flash typically found on portable devices offers limited ability to control the lighting conditions.

When image data 200 is captured using a portable device 100 incorporating an image sensor and a projector 108 it is possible to determine a lighting area that requires enhancement, and then generate an image to adjust the lighting. The generated image may then be projected onto the image subject and a further image captured under the improved lighting conditions.

Figure 3:
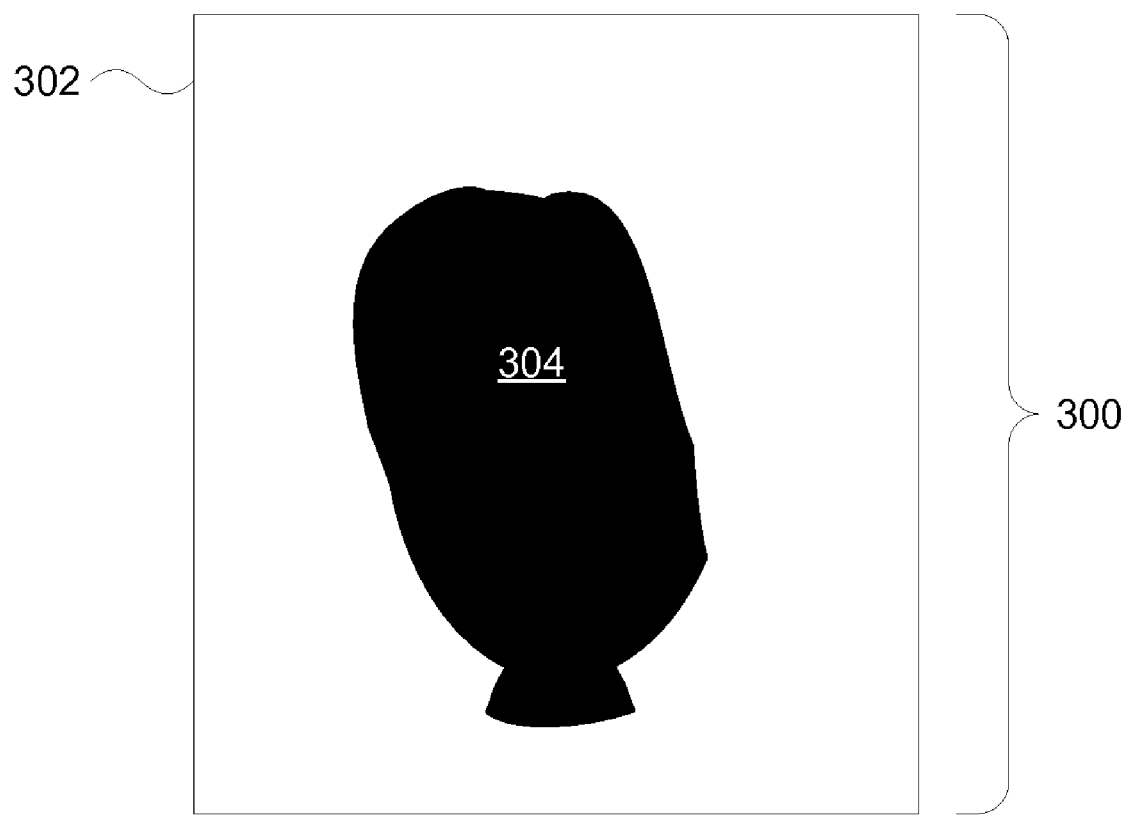
FIG. 3 depicts an illustrative flash image for adjusting lighting of an image subject.

FIG. 3 depicts an illustrative flash image for adjusting lighting of an image subject. The flash image 300 may be generated to compensate for over-lighting of the foreground image 204 depicted in FIG. 2. The flash image comprises a background 302 and foreground 304. As depicted, the image 300 will reduce the lighting striking the image subject area corresponding to the foreground area 304, while providing increased lighting for the background area 302 of the image subject.

The flash image 300 depicts a mask image, where light is masked in an area that is determined to be too brightly lit. It will be appreciated that different flash images may be generated. For example rather than completely masking light in an area, the flash image may simply reduce the light in an area. Furthermore, the lighting adjustments may be made to individual colors of projected light. If, for example, a red-eye condition is detected in the first captured image data, it is possible to generate a flash image that masks only the colour red in the area the red-eye condition is detected. When the image is projected, there will be no red light to be reflected back and captured, and as such the red-eye condition is reduced or eliminated. While the red-eye condition is reduced or eliminated the rest of the image subject may be lighted as appropriate by projecting the flash image with a fuller spectrum of light, including the colour red. Alternately, if the image is determined to include a face, then the color of the flash image in the area of the face 304 may be adjusted to enhance the flesh tone colors of the image of the face, while the flash color of the background area 302 may of a broader spectrum of light.

Figure 4:
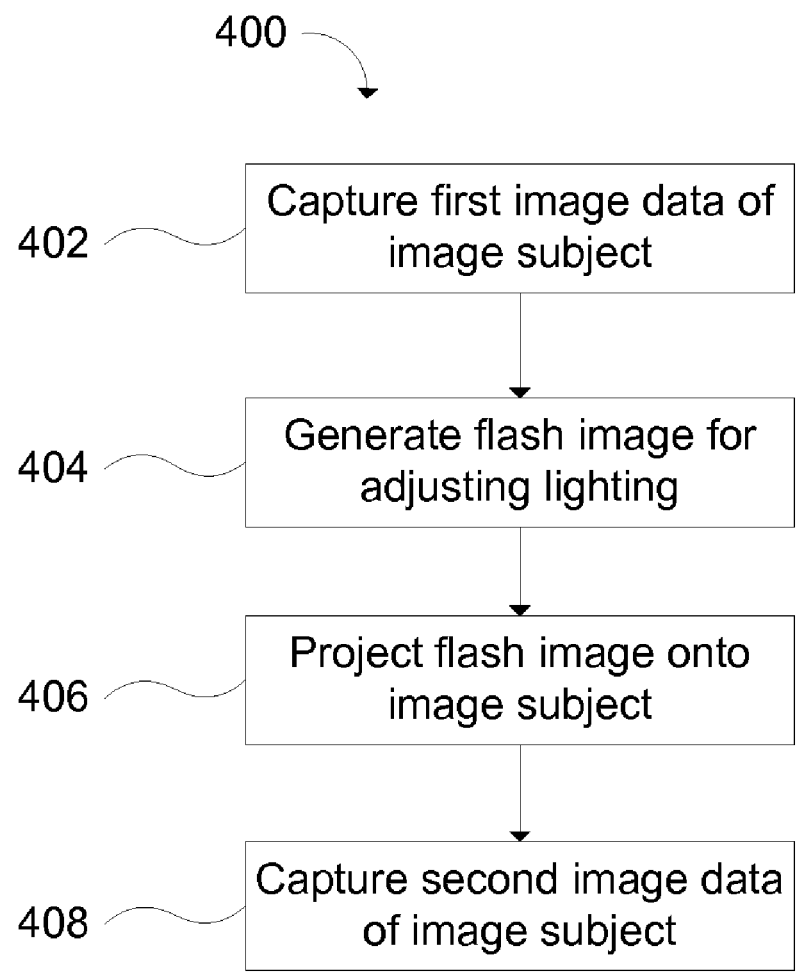
FIG. 4 depicts a flow chart of a method of capturing a still image on a portable device.

FIG. 4 depicts a flow chart of a method of capturing a still image on a portable device. According to the method 400, first image data of an image subject is captured (402). The image data is captured by an image sensor of a portable device. The first image data is processed and a flash image generated (404) for adjusting lighting of the image subject based on the captured first image data. Once the flash image is generated, it is projected onto the image subject (406) and second image data of the subject image lighted by the projected flash image is captured (408).

Figure 5:
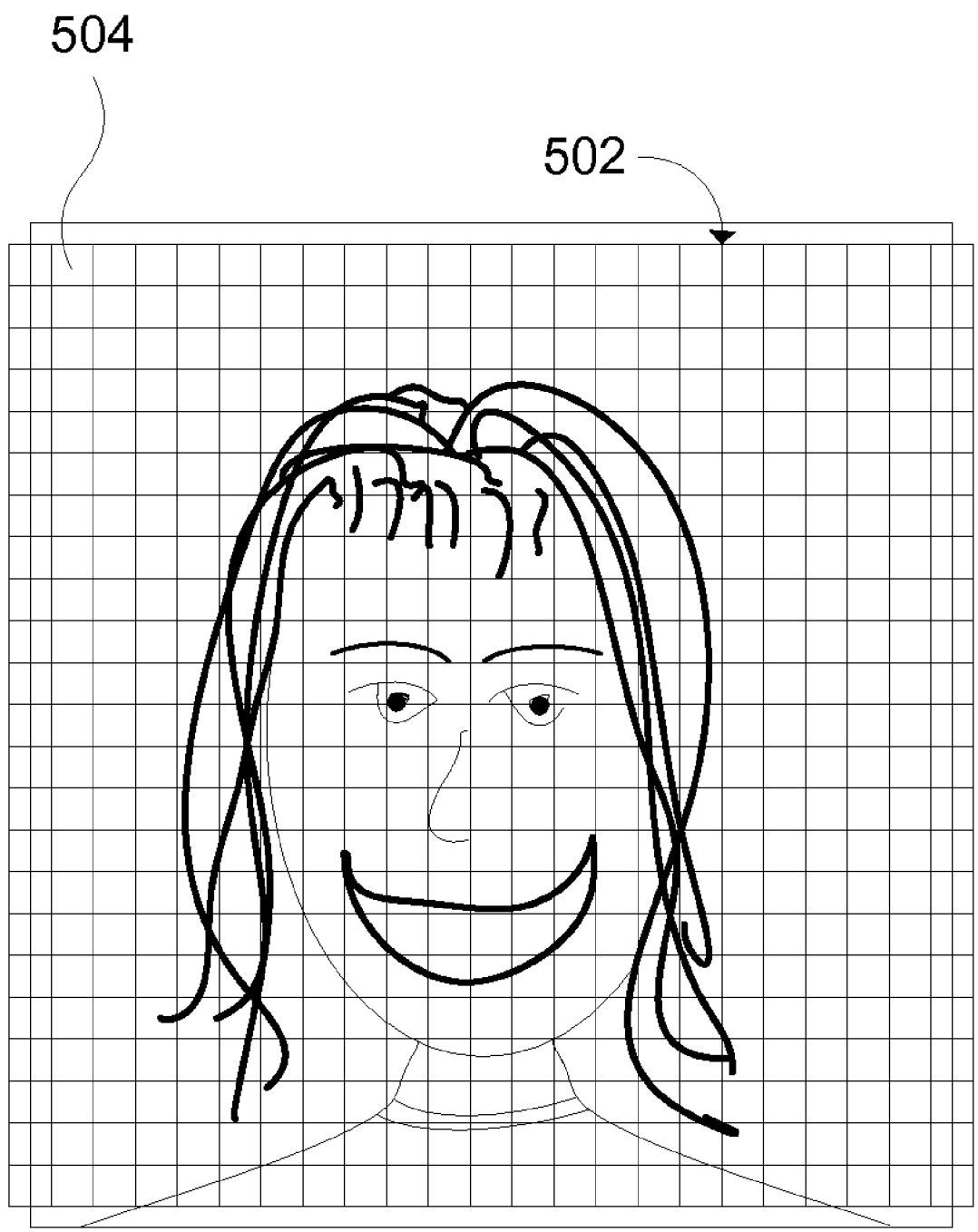
FIG. 5 depicts illustrative captured image data for segmenting.

FIG. 5 depicts illustrative captured image data for segmenting. The captured image data may be segmented by a grid 502 or similar pattern into a plurality of segments 504. The segmented image data may then be processed to determine a lighting condition of each segment. The lighting condition of each segment may then be used to generate a flash image to correct or adjust the lighting of each segment.

Figure 6:
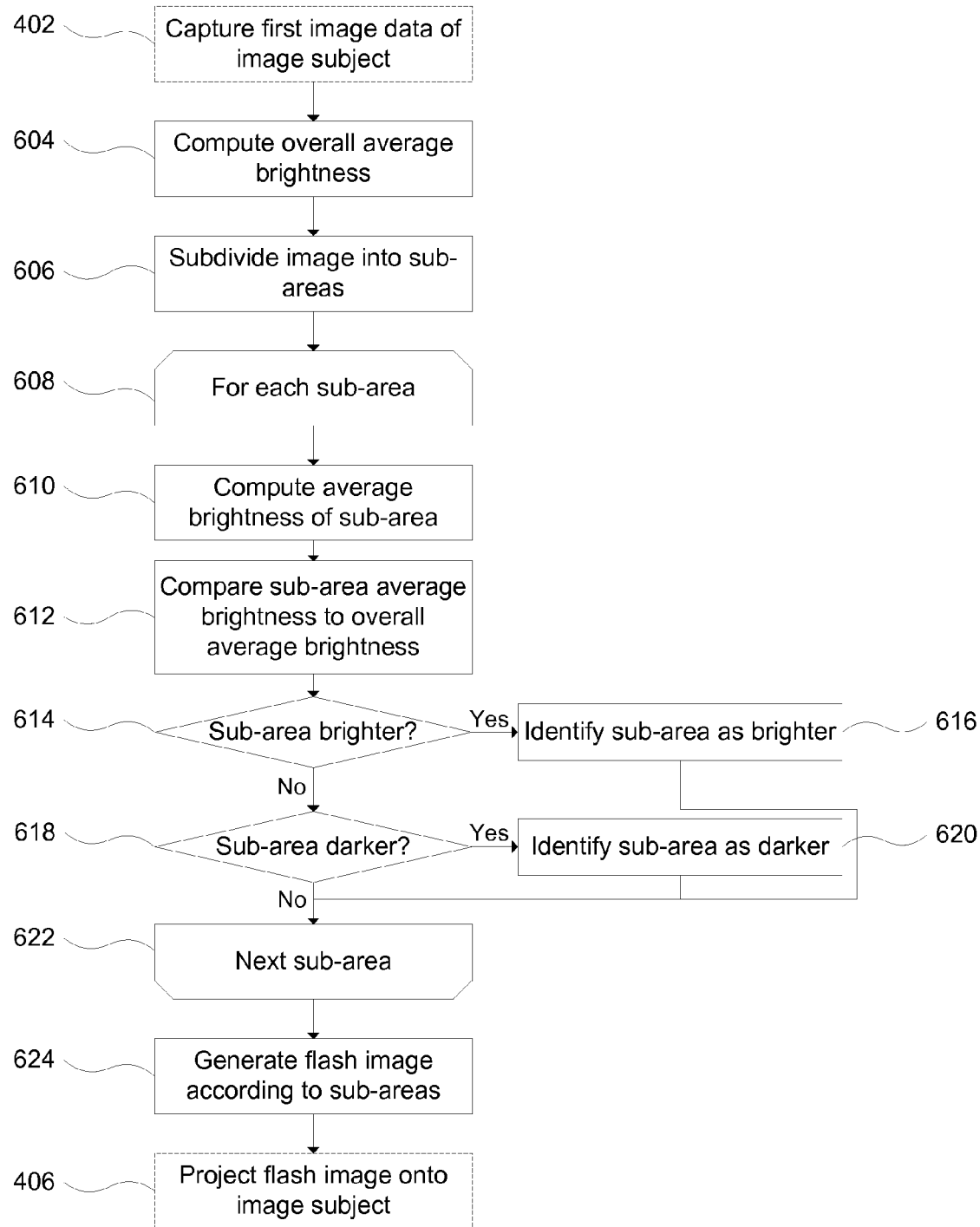
FIG. 6 in a flow chart a method of generating a flash image for adjusting lighting of an image subject.

FIG. 6 in a flow chart a method of generating a flash image for adjusting lighting of an image subject. The method 600 may be used to generate a flash image based on captured image data. First image data is captured of an image subject (402). Once the image data is captured it is processed by the portable device. The overall brightness of the image is computed (604). The captured image data is segmented into a plurality of sub-areas (606). Each sub area may be defined according to a grid as described above with reference to FIG. 5. Other means of dividing the image into sub-areas may also be possible. For example the image data may be sub-divided using facial recognition techniques to identify sub-areas representing a face within the image.

Regardless of the specific technique used to subdivide the image data into a plurality of sub-areas, the method 600 identifies a lighting characteristic for each sub-area (608-622). The identification of the lighting characteristic for the sub-areas may vary; however one example is provided with reference to FIG. 6. In particular, for each sub-area, the method computes an average brightness of the sub-area (610). The computed sub-area average brightness is compared to the overall average brightness of the entire image data (612). If the sub area is brighter (Yes at 614), the sub-area is identified as such (616). If the sub-area is not brighter that the overall average brightness of the image data (No at 614), it is determined if the sub-area is darker than the overall average brightness (618). If the sub-area is darker (Yes at 618) it is identified as such (620). Once the sub-area characteristic is determined, the next sub-area is compared.

When determining if the sub-area is brighter or lighter than the overall average brightness of the image data, a threshold value may be used to allow a range of brightness at which the sub-area may considered as bright as the overall average brightness. Furthermore, although the above describe only marking a sub-area as brighter or darker, it may be possible to identify the relative brightness, or darkness, of the area with respect to the overall average brightness. Additionally, it may also be possible to identify sub-areas as being neutral, or evenly as bright as the overall average brightness of the image data.

Once the lighting characteristic of each sub-area is identified, a flash image is generated that adjusts the lighting characteristic for the respective sub-areas (624) which is then projected onto the image subject (406).

In generating the flash image, each sub-area can be generated such that the lighting characteristics of the sub-area of the flash image corrects, or adjusts, the lighting characteristic. For example, if a sub-area of the image data is identified as being too bright, the intensity of the light projected onto the image subject corresponding to the sub-area may be reduced. Similarly, if the sub-area of the image data is identified as being too dark, the intensity of the light projected onto the image subject corresponding to the sub-area may be reduced. If the sub-area of the image data is neither too bright, nor to dark, the intensity of the light projected onto the image subject corresponding to the sub-area may be left unchanged.

Although the above has described a method of dynamically controlling lighting characteristics in a hybrid device comprising an image sensor and projector, modifications may be made. For example the specific order in which steps are performed may be changed, or combined. The average brightness of each sub-area may be determined, followed by determining the overall brightness of the image data and then comparing each sub-area brightness to the overall brightness. Additionally, although determining the sub-area brightness has been described as being done sequentially, it is possible to determine the average brightness of a plurality of sub-areas in parallel.

In addition to modifying when or how the steps are performed as described above, it is possible to add additional steps. For example, after capturing the second image data, the projector of the portable device may be used to project the captured second image data onto a surface for display. Additionally, prior to capturing the first image data, the portable device may project a base illumination image of uniform brightness and color onto the image subject. The base illumination image may act as an initial flash to provide a base amount of illumination for capturing the image data. If a base illumination image is projected onto the image subject, the subsequently generated flash image may be generated relative to the base illumination image. For example, the additional brightness or darkness provided by the generated flash image may be relative to the base illumination image. For example if a sub-area of the image data is identified as being brighter than the overall average brightness, then the flash image may be generated by reducing the light intensity of the base illumination image at the area corresponding to the sub area. Alternatively, a base illumination image may be added to the flash image after is generated.

If a base illumination image is projected onto the image subject while capturing the first image data, it may be desirable to have the intensity of the light projected by the base illumination image be a medium intensity that is possible to be projected by the projector. By having the base illumination layer being in the middle of the possible intensity, it provides a large possible range for both increasing and decreasing the intensity of the project light for adjusting the lighting conditions. If after capturing the first image data with the projected base illumination image, it is determined that the overall brightness of the captured image data is too low or too high, the base illumination image intensity that is used as a reference for generating the flash image, or that is added to the flash image, may be adjusted accordingly such that the overall brightness of the captured second image data is adjusted.

In operation, the second image data may be captured automatically once the first captured image data has been processed to generate the flash image. For example, if an input control, such as control 104 of portable device 100, is activated, the first image data may be captured, either with or without first projecting a base illumination image onto the image subject. Once the image data is captured it can be processed as set forth above to generate the flash image. Once the flash image is generated it can be projected by the projector of the portable device and the second image data captured.

When projecting the flash image onto the image subject, the location of the image subject in the first and second captured image data should be as close as possible relative to the position of the image sensor of the portable device. For example, if the portable device is moved significantly between capturing the first image data and the second image data, the generated flash image may not be projected correctly onto the image subject. If the portable device has a motion sensing or tracking component, it may be used to detect if the camera has moved significantly before capturing the second image data. If the camera has moved significantly the capturing of the second image data may be cancelled. Alternatively, the movement information provided by the motion sensing or tracking components may be used to adjust the generated flash image so that the flash image is projected appropriately onto the image subject in order to correct the lighting characteristics of the image subject determined from the first captured data.

Depending on the image subject, it may be necessary to determine a distance from the projector to the image subject. This information, or an estimate of it, may be available from the portable device if an auto-focus is provided. The information may be used to generate the flash image, or control the projector so that the areas of the flash image determined from sub-areas of the captured image data are projected onto the appropriate areas of the image subject.

Furthermore, the captured second image data, having lighting adjusted based on the projected flash image, may be processed in order to determine if the lighting adjustment provided by the projected flash image was sufficient. The captured second image data may be processed similarly as done for the captured first image data described above. A second flash image may then be generated, either as a new flash image, or by adjusting the previously generated flash image. Once the second flash image is generated, it may be projected onto the image subject and a third image data may be captured while the second flash image is projected on the image subject.

Alternatively, to the second flash image described above, which provides additional correction based on the processing of captured second image data, a plurality of flash images may be generated based on the captured first image data. Each of the flash images may provide a different level of lighting adjustment. Once the flash images are generated, separate image data may be captured while each generated flash image is subsequently projected onto the image subject. This may provide a plurality of similar images; however, the lighting adjustment to each image will differ and allow a photographer to select the best or most desirable image data.

Figure 7:
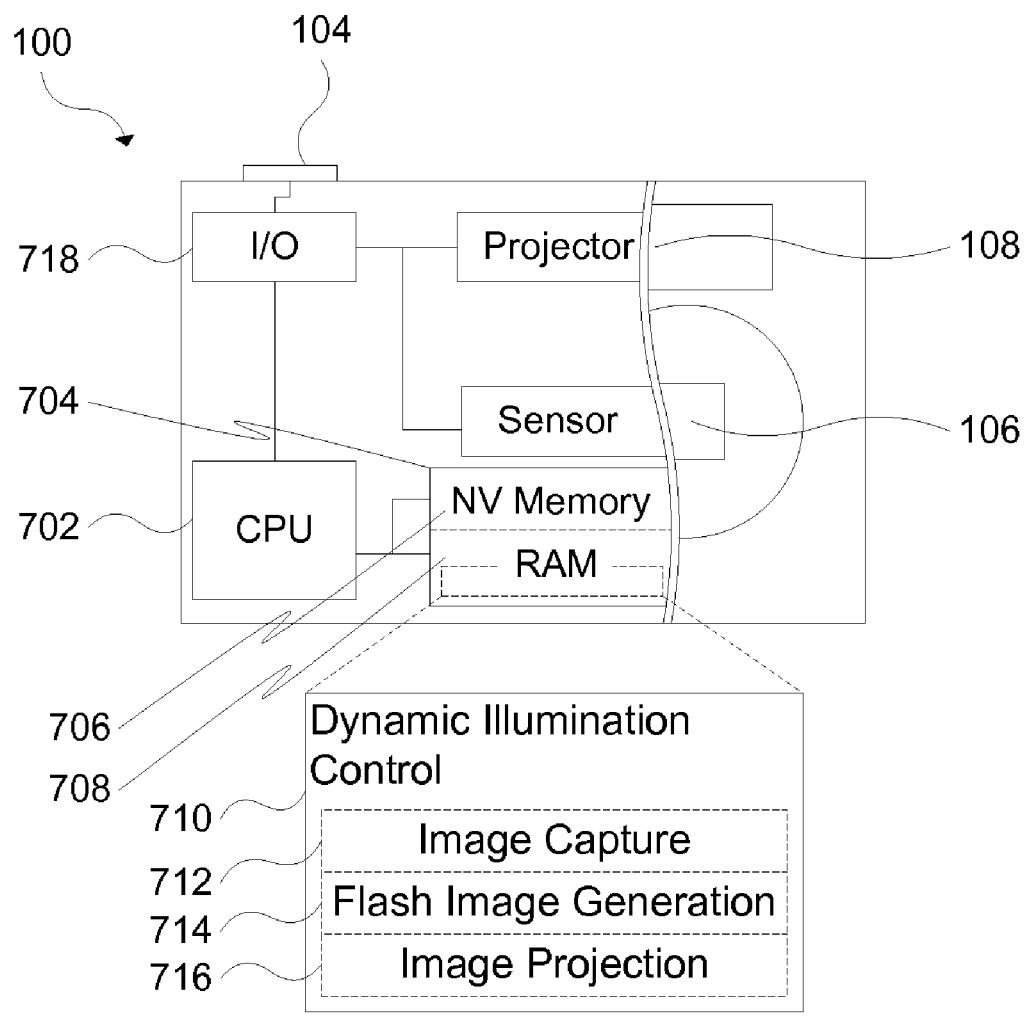
FIG. 7 depicts a cutaway view of a portable camera in accordance with the present disclosure.

FIG. 7 depicts a cutaway view of a portable camera in accordance with the present disclosure. The camera 100 comprises the projector 108, image sensor 106 and control 104 as well as a CPU 702 for executing instructions. The instructions may be stored in memory 704 of the camera. The memory 704 may comprise both non-volatile (NV) memory 706 for storing information even if the camera is powered off and random access memory (RAM) 708 for temporarily storing information and instructions 710 for execution by the CPU 702. The instructions 710 stored in RAM 708 may comprise instructions for configuring the camera to provide the dynamic illumination control described above. As depicted, the instructions 710 may include instructions for providing image capture control 712, flash image generation 714 and image projection 716. Although depicted as part of the dynamic illumination control, components thereof may also be used outside of the dynamic illumination control. For example, the instructions for providing image capture control 712 may be used to capture image data even if the dynamic illumination control is not used such as when the image subject is adequately illuminated by external light sources. Additionally, the instruction for providing image projection 716 may be used to project a generated flash image while capturing second image data, as well as to project captured image data on a surface for display to one or more people. Although the portable device is described as comprising instructions for providing various functionality, it will be appreciated that the functionality may be provided directly by the hardware of the portable device, such as the CPU 702.

The different components of the camera are depicted being connected to the CPU 702. The memory 704 is depicted as being connected directly to the CPU 702, while the projector 108, sensor 106 and control 104 are depicted as being connected to the CPU through an I/O controller 718. Other connections of components may be possible. For example, the memory may be connected to the I/O control 718 or a separate memory controller. The projector 108 and sensor 106 may be connected directly to the CPU 702, or through separate controllers. Alternatively the projector 108 and sensor 106 may be coupled to the memory 704 through a controller and store and/or retrieve data from known location. The CPU 702 may access this known location to communicate information with the processor 108 and sensor 106.

Although the above has been described with reference to a portable device being a camera, it is possible to provide different portable devices with a projector and sensor. For example a portable device may include, in addition to the projector and sensor, at least one wireless communication radio for providing wireless communication capabilities to the portable device. For example the portable device may be a phone or smart-phone incorporating both a camera and a projector as well as a communication system including a wireless transceiver. It should be noted that in order to provide dynamic illumination control, the projector and the sensor should be facing in the same direction so that the sensor can capture image data of the image subject while the projector projects a flash image onto the image subject. Further portable devices are possible such as a laptop computer or tablet computer.

What is claimed is:

1. A method of capturing a still image on a portable device comprising:
    capturing first image data of an image subject using an image sensor of the portable device;
    processing the captured first image data to identify a red-eye condition area of the first image data;
    generating a flash image mask light, or red light, from being projected onto the red-eye condition area;
    projecting the generated flash image onto the image subject using a projector of the portable device; and
    capturing second image data of the image subject while the flash image is projected.

2. The method of claim 1, wherein generating the flash image further comprises:
    processing the captured first image data to identify a lighting area of the first image data;
    generating the flash image for further adjusting lighting of the identified lighting area in the first image.

3. The method of claim 1, further comprising projecting the captured second image data onto a surface for display.

4. The method of claim 2, wherein identifying the lighting area comprises:
    computing an average brightness (overall brightness) of the first image data;
    identifying an area in the first image data;
    computing an average brightness (local brightness) of the identified area;
    comparing the overall brightness to the local brightness;

identifying the identified area as a dull area if the local brightness is less than the overall brightness; and identifying the identified area as a bright area if the local brightness is greater than the overall brightness.

5. The method of claim 4, wherein generating the flash image further comprises:

generating the flash image to increase the light to be projected onto the dull area; or generating the flash image to decease the light to be projected onto the bright area.

6. The method of claim 1, wherein generating the flash image further comprises generating the flash image to adjust a colour of the image subject.

7. The method of claim 1, wherein generating the flash image further comprises generating the flash image for adjusting lighting of a plurality of areas of the first image data.

8. The method of claim 7, wherein the lighting of each of the plurality of areas of the first image data are adjusted independently.

9. The method of claim 1, further comprising:

generating a second flash image for adjusting lighting of the image subject based on the captured second image data to further adjust the lighting of the image subject;

projecting the generated second flash image onto the image subject using the projector of the portable device to further; and capturing third image data of the image subject while the second flash image is projected.

10. The method of claim 1, further comprising:

adding a base illumination image for providing overall illumination to the image subject to the flash image prior to projecting the flash image.

11. A portable device comprising:

an image sensor for capturing image data of an image subject;

at least one processor coupled to the image sensor for processing the captured image data and generating a flash image to illuminate the image subject;

a memory unit coupled to the at least one processor storing instructions for execution by the processor, the instructions when executed by the at least one processor configuring the portable device to generate the flash image, the instructions comprising:

instructions for processing the captured first image data to identify a red-eye condition area of the first image data; and instructions for generating the flash image to mask light, or red light, from being projected onto the red-eye condition area; and an image projector for projecting images or videos for display and the generated flash image for adjusting lighting of the image subject.

12. The portable device of claim 11, wherein the instructions further comprise:

instructions for processing the captured first image data to identify a lighting area of the first image data; and instructions for generating the flash image for adjusting lighting of the identified lighting area in the first image.

13. The portable device of claim 11 wherein the instructions further comprise:

instructions for computing an average brightness (overall brightness) of the first image data;

instructions for identifying an area in the first image data;

instructions for computing an average brightness (local brightness) of the identified area;

instructions for comparing the overall brightness to the local brightness;

instructions for identifying the identified area as a dull area if the local brightness is less than the overall brightness; and instructions for identifying the identified area as a bright area if the local brightness is greater than the overall brightness.

14. The portable device of claim 13, wherein the instructions further comprise:

instructions for generating the flash image to increase the light to be projected onto the dull area; or instructions for generating the flash image to decease the light to be projected onto the bright area.

15. The portable device of claim 11, wherein the instructions further comprise:

instructions for projecting the captured second image data onto a surface for display.

* * * * *